United States Patent [19]

Hutchison

[11] Patent Number: 5,528,123
[45] Date of Patent: Jun. 18, 1996

[54] POWER CIRCUIT

[75] Inventor: James B. Hutchison, Palo Alto, Calif.

[73] Assignee: Acuson Corporation, Mountain View, Calif.

[21] Appl. No.: 775,465

[22] Filed: Oct. 15, 1991

[51] Int. Cl.⁶ .................................................. G05F 1/70
[52] U.S. Cl. .................... 323/205; 363/46; 363/89; 323/267
[58] Field of Search .................... 323/267, 207, 323/205, 210; 363/44–48, 89, 126, 146; 307/31

[56] References Cited

U.S. PATENT DOCUMENTS

| | | | |
|---|---|---|---|
| 4,306,283 | 12/1981 | Kiwaki et al. | 363/68 |
| 4,529,925 | 7/1985 | Tanaka et al. | 323/207 |
| 4,590,416 | 5/1986 | Porche et al. | 323/205 |
| 4,688,162 | 8/1987 | Mutch et al. | 363/80 |
| 4,914,559 | 4/1990 | Deisch | 363/126 |

*Primary Examiner*—Peter S. Wong
*Assistant Examiner*—Adolf Berhane

[57] ABSTRACT

This invention measures the total line current in a power cord which is used to energize both a power factor corrected system and non-power factor corrected AC loads. The power factor control loop of the power factor corrected system is then driven to correct the power factor of total line current in the power cord ideally to approach unity.

3 Claims, 1 Drawing Sheet

POWER CIRCUIT

BACKGROUND OF THE INVENTION

This invention relates to power factor corrected power supplies and more particularly to a power circuit for supplying electrical energy to both a DC power supply and one or more AC accessory outlets or loads. Conventional power factor corrected (PFC) power supplies can sense their own input current and correct that current to maintain a good power factor (i.e., one that approaches unity or in phase with the line current). However, when AC accessories or loads are supplied with the same power cord as the power factor corrected power supply, the poor power factor of the AC loads degrades the overall power factor of the system as measured with respect to the line current input from the wall plug.

SUMMARY OF THE INVENTION

The novel concept of this invention is to measure the total line current both to a power factor corrected system and non-power factor corrected AC loads and then to drive the power factor control loop in the power factor corrected system as a whole so that it corrects the power factor of the total line current ideally to approach unity.

BRIEF DESCRIPTION OF A PREFERRED EMBODIMENT

Figure 1:
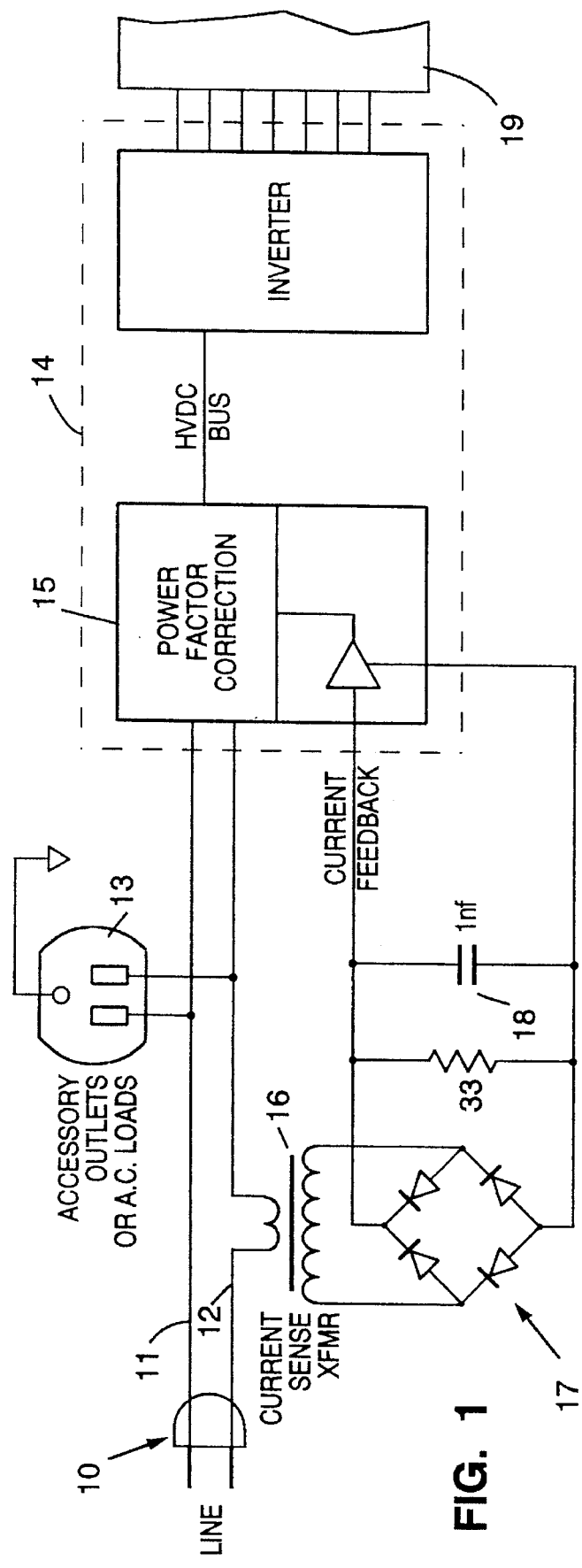
FIG. 1 is a schematic diagram of a preferred embodiment of the invention for supplying AC electrical energy to both a DC power factor corrected system and one or more AC accessory outlets or loads.

FIG. 1 illustrates a power circuit for supplying electrical energy that comprises a power cord 10 from a wall plug having a pair of conductors 11 and 12, at least one accessory outlet 13 for servicing and supplying power to one or more accessories or AC loads, a power factor corrected power supply 14 including a power factor corrector 15 connected to the conductors in parallel with the accessory outlet 13, a current sensing transformer 16 in one conduit of the power cord for sensing total AC line current and rectifier bridge 17 for developing a corrective DC signal across capacitor 18 which is supplied as the current-feedback signal in the power factor corrector 15 control loop. This power circuit is adapted for use in supplying power to a power factor corrected system that includes a DC power supply 14 and one or more DC loads 19. The current-feedback control loop in power factor corrector 15 maintains line current drawn from the wall plug with a power factor that approaches unity.

Figure 2:
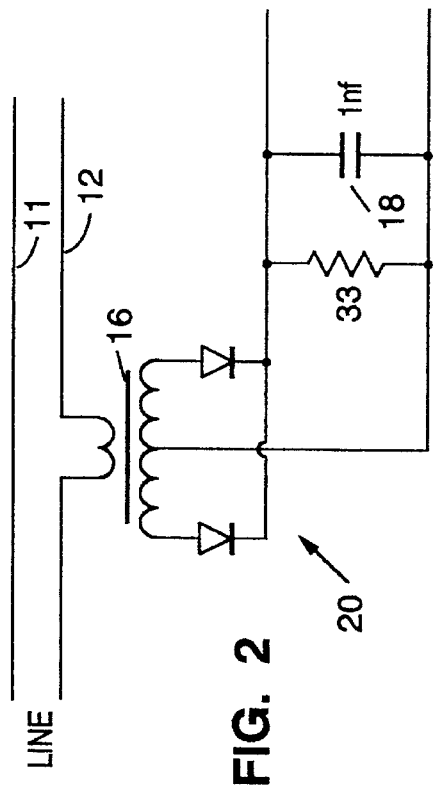
FIG. 2 is a second embodiment of a current sensing means for implementing power factor correction using a current sensing transformer.

FIG. 2 illustrates an alternative form of current sensing transformer 16 and converter 20 for driving the power factor corrector 15 with an additive DC corrective signal across capacitor 18.

The essential concepts of the invention are:

(a) the current sensor 16 measures the total current drawn by both the DC power supply and the AC loads, not just the current drawn by the DC power supply, and (b) the power factor corrector 15 corrects total line current drawn from the wall plug through the power cord so that it approaches a unity power factor, i.e., the current being sinusoidal and in phase with the line voltage.

Although preferred embodiments of the invention are illustrated and described, various modifications and changes may be apparent without departing from the invention defined in the appended claims.

What is claimed is:

1. A power circuit for supplying power-factor-controlled electrical energy concomitantly to AC and DC loads, comprising:

an AC power cord having a pair of conductors, means connected in parallel with said AC power cord to provide an AC output, means connected in parallel with said AC power cord for correcting the power factor therein and having a DC output, current-sensing means connected to said AC power cord for sensing total line current, and means responsive to said current-sensing means for applying to said power-factor-correcting means a corrective signal based upon said sensed total line current, whereby the power factor of the current in said AC power cord is corrected with respect to both said AC and DC loads.

2. The power circuit of claim 1, said power-factor-correcting means being connected in a system that comprises a DC power supply and one or more DC loads.

3. The power circuit of claim 1, said power-factor-correcting means being controlled to maintain (a) an AC line current having a power factor that approaches unity.

* * * * *